July 29, 1969    R. L. BERRY ET AL    3,457,730
THROTTLING VALVE EMPLOYING THE JOULE-THOMSON EFFECT
Filed Oct. 2, 1967
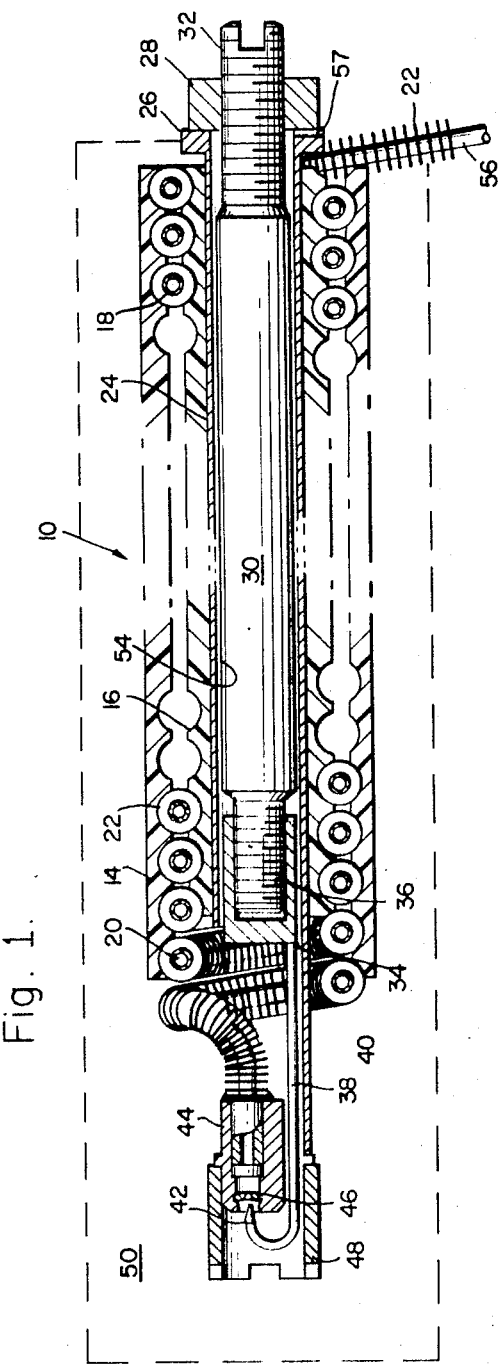
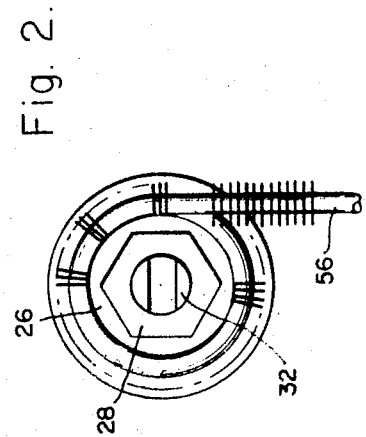
Robert L. Berry,
Anthony L. Vodopia,
INVENTORS.
BY.
ATTORNEY.

United States Patent Office 3,457,730
Patented July 29, 1969

3,457,730
THROTTLING VALVE EMPLOYING THE JOULE-THOMSON EFFECT
Robert L. Berry, Palos Verdes Peninsula, and Anthony L. Vodopia, Los Angeles, Calif., assignors to Hughes Aircraft Company, Culver City, Calif., a corporation of Delaware
Filed Oct. 2, 1967, Ser. No. 672,072
Int. Cl. F25b 41/04, 9/02
U.S. Cl. 62—223                             9 Claims

ABSTRACT OF THE DISCLOSURE

An automatic flow control valve is disclosed having particular utility in the control of the flow of cryogenic fluids where a Joule-Thomson effect is utilized to provide cooling with a Dewar at low cryogenic temperatures. The valve comprises inner and outer insulators having spirally wound finned tubing therebetween, the tubing terminating in a valve seat. The tubing provides the means for delivery of the cryogenic fluid to the valve seat. A supporting tube is provided within the inner insulator having a temperature sensing element disposed therein. A valve needle is fixedly mounted to one end of the sensing element and is in operative flow relation with the valve seat. The sensing element at its inner end is subject to low cryogenic temperature in the Dewar and at its outer end is in heat transfer relation with environment temperature. The linear expansion and contraction of the sensing element results from variation in either the low temperature or the environment temperature which moves the connected valve needle into and out of the valve seat thereby regulating fluid flow in direct response to variation in low temperature and variation in environment temperature.

---

The invention relates to a throttling valve to control fluid flow in a low temperature refrigerating arrangement which is automatically responsive to a variation in internal and external temperature to regulate the rate of flow.

It is well known that the Joule-Thomson effect may be used to bleed or throttle flow certain types of gases such as nitrogen, argon, hydrogen or helium and expand same to produce a cryogenic refrigerating effect. Devices to achieve refrigeration utilizing this effect are known as cryostats. The effect and the devices utilized to produce the effect may produce refrigerating temperatures in the low cryogenic range, for example, in the range of 77° Kelvin and below.

In most service applications it is desired to maintain refrigeration at a definite level. To achieve satisfactory control, it is necessary to regulate the flow of the cryogenic fluid in response to variation in refrigerated temperature, this variation resulting from normal heat loss and a variation in environment temperature condition. To achieve fluid flow control, some prior art devices employed bi-metal springs in the refrigerating region which would move in response to temperature variation to open or close a valve. Also, bellows devices, movable in response to temperature variation, have been used to control fluid flow. Still other more complicated arrangements have utilized direct control of fluid pressure to regulate flow in response to a sensed variation in temperature in the cold region. Characteristically, these devices have been mechanically complicated, expensive, and have not offered the effective flow control desired.

The present invention provides a structure which is responsive to variation in temperature level in the refrigerated region and the environmental region and regulates the fluid flow in response to said variations. As a result of this two-condition response feature, the present device is inherently more stable resulting in more accurate setpoint temperature control in the refrigerated region.

Specifically, it is a primary object of the invention to provide, in combination with a cryostat of the type described, a throttling valve which controls flow in response to the linear expansion and contraction of a sensing element, said expansion and contraction of said element being concurrently responsive to variations in environment temperature and variations in temperature in the refrigerated region.

It is therefore an important object of the invention to provide a device of the type described which will function to produce close and more stable set-point temperature control in the refrigerated region than prior art devices.

These and other features and advantages of the invention will become apparent in the course of the following description and from an examination of the related drawings wherein:

FIGURE 1 is a vertical, sectional view partially in elevation of a cryostat incorporating the invention; and FIG. 2 is an end elevational view taken from the right of the structure shown in FIG. 1.

Directing attention to the drawings, the cryostat and throttle valve assembly is indicated generally at 10. As will be well known to those skilled in the art, the assembly such as here shown is normally disposed in a Dewar which is simply an external insulating container and accordingly is here shown diagrammatically by the phantom line 12.

The assembly 10 comprises an outer insulating annular cylindrical member 14 and an inner annular cylindrical member 16. The insulating members 14 and 16 are spaced from each other and cavities to receive a spirally wound finned tubing shown at 18. The tubing 18 comprises a center passage 20 having fins 22 annularly disposed therearound.

An inner supporting tube 24 is telescopically received, for example, by press-fit within the inner insulating member 16 in a central elongated cavity formed therein. The tube 24 may be provided with an external flange 26, the latter serving as an abutment for an adjusting nut 28 hereinafter described. A temperature sensing element 30 is disposed within the tube 24 and has a threaded portion 32 receiving the nut 28. The rear aspect of the sensing element 30 projects externally of the nut 28 as is shown in the drawing. While many materials may be used for the sensing element 30, depending upon the service application, in the preferred embodiment herein described plastic materials known by the trade names of Delrin or Nylon have been found satisfactory.

A collar 34 is secured, as, for example, by threaded engagement at 36, to the inner end of sensing element 30 and provides means to braze mount a metallic needle 38 thereto as at 40. The needle 38 projects to the left as seen in FIG. 1 and is provided with a hook-like point as at 42. The spirally wound tube 18 terminates at a valve seat element 44, the latter having a valve seat 46 at one end operatively aligned with the needle point 42 of the element 38. A deflector and support element 48 is carried by the support tube 24 and provides means to mount the valve seat element 44 and to accommodate passage of the needle element 38 alongside thereof.

As noted above, the disclosed cryostat and throttle valve arrangement is designed to utilize the refrigerating capability of the Joule-Thomson effect. In simple terms this effect means that gas under pressure is bled through a valve to an area of lower pressure. In expanding, it absorbs heat in the low pressure area thus producing a refrigerating effect. The chamber 50 in the Dewar 12 may define the low-pressure volume.

In operation, the inner aspect of the sensing element 30 is adjacent the refrigeration region 50 of the Dewar 12. At its opposed end the outer aspect 32 of the sensing element 30 is in thermal transfer relation with the environment condition. Additionally, a small space 54 exists between the sensing element 30 and its surrounding supporting tube 24.

Assuming that a cryogen fluid such as nitrogen, argon, hydrogen or helium is used, it will be understood that the fluid enters the arrangement via lead-in pipe 56 which communicates with the spirally wound tubing 18. The moving fluid progressively encircles the arrangement and finally escapes from the valve seat 46 of valve element 44 to the lower pressure volume 50. As a result of its expansion during escape, the temperature is progressively lowered until the desired level is reached.

The cold gas within the chamber 50 also circulates around the fins 22 of the tubing 18 having the effect of precooling the gas before its escape from valve seat 46. Additionally, the expanded and cooled fluid may travel through the space 54 immediately surrounding the sensing element 30 effectively cooling same and providing a temperature gradient within the sensing element 30 from approximately the refrigerating level at its inner aspect to environmental temperature at the exposed end 32. Slot 57 in collar 26 permits the escape of this gas. It will also be apparent that the position of the sensing element 30 and needle point 42 relative to the valve seat 46 may be adjusted by the mounting nut 28.

As the temperature within the volume 50 varies, there results an expansion or contraction of the sensing element 30, this movement being primarily linear along the long axis of the element 30 whereby the needle point 42 moves into or out of the valve seat 46 allowing more or less fluid to bleedingly escape therefrom. For example, as the temperature lowers, the element 30 contracts tending to close the fluid valve seat, and, in the alternative, as the temperature rises, the sensing element 30 expands, opening the valve seat 46. Also, as environment temperature varies, its effect is transmitted to element 30 and end 32 and a similar expansion or contraction of the sensing element 30 occurs resulting again in movement of the needle point 42 and variation in the flow of fluid from the valve seat 46.

It will thus be apparent that a highly stable bleeding valve control is provided with rapidly responds to variation in refrigerated temperature and to variation in environment temperature to increase or decrease the bleeding escape of a cryogenic fluid from the escape valve seat into the expansion chamber and thereby directly influence refrigeration in the chamber. Because of the direct response of the structure to variations in the temperature level of both environment and in the refrigerated region a highly stable cold temperature and control set point thereof is obtained.

The invention as disclosed is by way of illustration and not limitation and may be modified in many aspects all within the spirit and scope thereof:

What is claimed is:

1. Valve arrangement means to control the throttling flow of a fluid in response to temperature variation and employing the Joule-Thomson effect the combination of:
   a receptacle to receive the arrangement having a refrigerating zone therein,
   an inlet passage to accommodate fluid flow to the zone,
   throttling valve means at the inner terminus of the passage,
   and a sensing element comprising a unitary elongated rod having one end in the refrigerating zone whereat it is operatively connected to the valve means and the other end projecting into ambient environment whereby the valve means is opened and closed in response to temperature variations in both the zone and in ambient environment.

2. A valve arrangement to control the throttling flow of a fluid in response to temperature variation according to claim 1,
   wherein said sensing element is linearly elongated,
   said valve means comprising a valve seat member operative to receive a valve member,
   said element being connected to one of said members to induce relative movement between the members resulting from expansion and contraction of said sensing element in response to said temperature variations.

3. A valve arrangement to control the throttling flow of fluid in response to temperature variation according to claim 2,
   wherein said valve member is a pointed needle carried in telescopic relation with said valve seat member.

4. A valve arrangement to control the throttling flow of a fluid in response to temperature variation according to claim 3,
   wherein said elongated sensing element has one segment projecting into the zone and another segment projecting externally of the arrangement into ambient environment,
   said one segment carrying the needle resulting in movement thereof relative to said valve seat member in response to the linear expansion and contraction of the sensing element.

5. A valve arrangement to control the throttling flow of a fluid in response to temperature variation according to claim 4, and including,
   inner and outer insulating elements surrounding the passage,
   said passage comprising a tube interposed between the insulating elements,
   said tube terminating at the valve seat member in the zone,
   said insulating elements being spaced to accommodate the circulation of cool fluid around the tube.

6. A valve arrangement to control the throttling flow of fluid in response to temperature variation according to claim 5, and including,
   a hollow supporting body telescopically received within the inner insulating element and in return telescopically receiving said elongated sensing element,
   said sensing element having a transverse dimension less than the transverse inner dimension of the hollow body to accommodate the flow of cool fluid around the sensing elements.

7. In a throttling valve arrangement to control the flow of fluid in response to temperature variation in a refrigerating zone and in an environmental zone, the combination of,
   a Dewar having the refrigerating zone therein,
   an inlet passage to accommodate the flow of fluid to the refrigerating zone,
   valve means at the termination of the passage in the refrigerating zone, and
   elongated sensing means having one end penetrating the Dewar and disposed in the zone and connected to the valve means, the other end extending externally of the Dewar into the environmental zone, said sensing means being operative to expand and contract in response to temperature variations in both of said zones and thereby control the throttling flow of fluid at the valve means.

8. A valve arrangement according to claim 7, wherein said passage means comprises a finned tubing, and other passage means having the finned tubing disposed therein accommodating the escape of fluid to the environmental zone from the refrigerating zone, said escaping fluid moving over the finned tubing so as to be in heat transfer relation therewith to cool the fluid in the tubing.

9. A valve arrangement according to claim 8, and including flow path means whereby fluid from the refrigerating zone may pass therethrough to the environmental zone and be in thermal transfer relation with the elongated sensing means.

References Cited

UNITED STATES PATENTS

| | | | |
|---|---|---|---|
| 2,909,908 | 10/1959 | Pastuhov | 62—514 |
| 2,971,349 | 2/1961 | Orth | 62—225 |
| 3,257,823 | 6/1966 | Hogan | 62—514 |
| 3,269,140 | 8/1966 | Peterson | 62—514 |
| 3,320,755 | 5/1967 | Jepsen | 62—514 |

MEYER PERLIN, Primary Examiner

U.S. Cl. X.R.

62—224, 467, 514